(No Model.)
S. W. MYERS.
PLANTER ATTACHMENT.
No. 578,757. Patented Mar. 16, 1897.
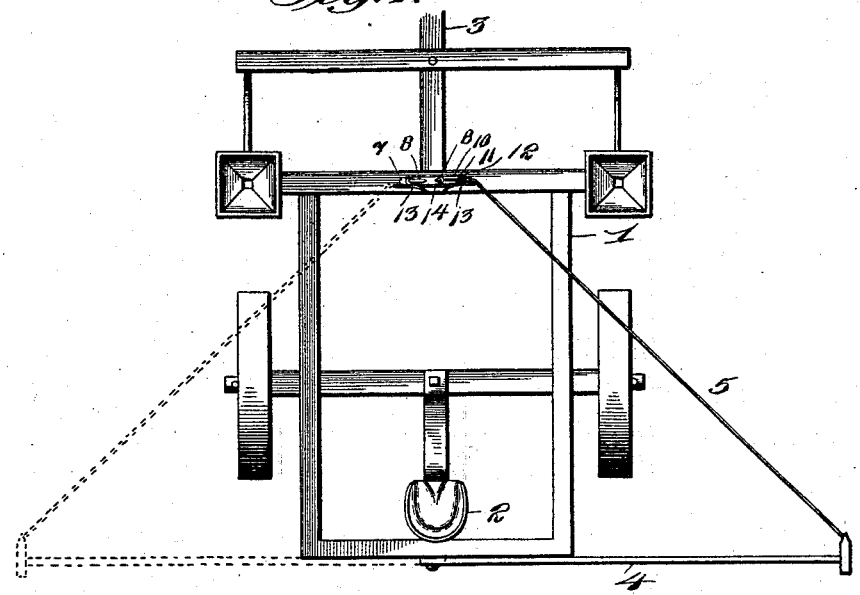
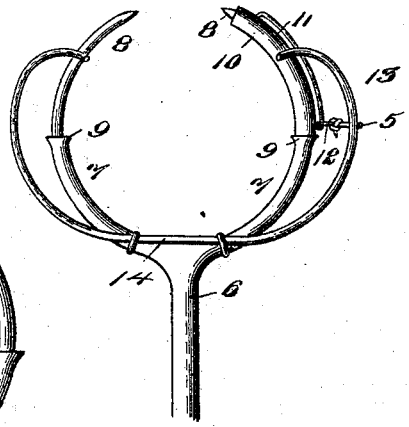
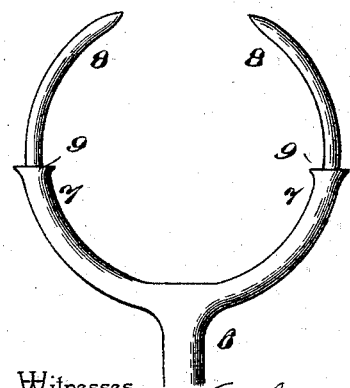
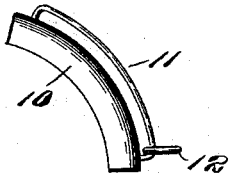
Witnesses
F. J. Koorth.
V. B. Hillyard.
Inventor
Squire W. Myers,
By his Attorneys,
C. A. Snow & Co.

UNITED STATES PATENT OFFICE.

SQUIRE W. MYERS, OF SUGAR GROVE, ILLINOIS.

PLANTER ATTACHMENT.

SPECIFICATION forming part of Letters Patent No. 578,757, dated March 16, 1897.

Application filed April 8, 1896. Serial No. 586,717. (No model.)

*To all whom it may concern:*

Be it known that I, SQUIRE W. MYERS, a citizen of the United States, residing at Sugar Grove, in the county of Kane and State of Illinois, have invented a new and useful Planter Attachment, of which the following is a specification.

This invention relates to planters having marking attachments which are adapted to be thrown from one side to the other when turning the planter to recross the field. These markers usually consist of a pole having pivotal connection at its inner end with the planter-frame and carrying a marker at its outer end, said pole being located within convenient reach of the driver's seat, so as to be shifted without necessitating the dismounting of the driver to reset the marker, and the latter is strengthened at its outer end by a brace-rope having connection with the front portion of the frame at a middle point, the brace-rope and marker moving together when throwing the pole from one side of the machine to the other.

In the class of planters herein mentioned considerable annoyance is occasioned in adjusting the reins after shifting the marker, so that the brace-rope will not extend over and impede the free use of the reins, and the purpose of this invention is to provide a simple and effective means to enable the brace-rope to pass by the reins when shifting the marker without requiring any special attention on the part of the driver or any extra effort; and with these and such other ends as pertain to the nature of the invention the latter consists in certain details of construction and novel combinations of parts, which hereinafter will be more particularly set forth, illustrated, and claimed.

Referring to the drawings, Figure 1 is a top plan view of a planter having the invention applied, the dotted lines showing the reverse position of the marker and its brace-rope. Fig. 2 is a rear elevation of the attachment. Fig. 3 is a detail view of the frame or standard. Fig. 4 is a detail view of the shiftable sleeve.

Corresponding and like parts are designated in all the views of the drawings and in the following description by the same reference-characters.

The numeral 1 indicates the frame of a planter of ordinary construction, 2 the driver's seat, and 3 the pole or tongue, to which the draft is applied for drawing the machine over the field. The marker 4, as is usual, is pivotally connected at its inner end to the frame at a middle point and within convenient reach of the driver's seat, so as to be thrown from one side of the planter to the other, according to the direction of travel of the machine over the field.

The brace rope or line 5 has connection with the outer end of the marker and is secured at its forward end to the front portion of the planter-frame, so as to move with the marker from one side to the other of the planter when shifting the marker. The particular means employed for connecting the front end of the brace 5 with the frame constitutes the essence of this invention.

A standard 6 is applied to the front portion of the planter-frame at a point about midway of its sides and is provided with oppositely-curved arms 7, which unitedly approximate the form of a circle, and these arms are similarly formed and are spaced apart at their free ends to admit of the reins or lines having free ingress and egress from the space inclosed by the said arms, as required. The upper portion 8 of the arms is reduced, forming shoulders 9, and a segmental sleeve 10 is shiftably mounted upon the said reduced portions, so that it may occupy a position upon one or the other of the arms, according to the location of the marker and the direction in which the planter is traveling. The terminal portions of the arms are pointed or tapering, so as to facilitate the transfer of the sleeve from one arm to the other when shifting the marker. A curved rod or bar 11 is secured at its ends to the sleeve 10, near its extremities, and a ring 12 is slidably mounted upon the said rod and is guided in its movements thereby. The brace rope or line 5 is connected to the ring 12.

The operation of the invention is as follows: When the marker is in service, the ring 12 will occupy a position at the lower end of the guide-rod 11, and when it is required for any purpose, as when turning the planter to recross the field, to shift the marker the reins or lines are dropped into the space between the arms 7 and the marker 4 is grasped in the usual way and thrown from one side of the planter to the other. In its travel the marker will pull upon the brace 5 with sufficient force to cause the sleeve 10 to move from one arm 7 to the other, thereby carrying the front end of the brace over and past the reins or lines, which latter may be removed or disconnected from the standard, if so desired. When the sleeve 10 shifts from one arm 7 to the other and drops by gravity and the impulse of the pull upon the rope 5 onto the stop 9, the ring 12 will slide upon the guide-rod 11 to the lower end thereof, which end previously was the upper end. Thus it will be seen that the attachment is simple, effective, and reliable.

To prevent binding of the sleeve upon the arms 7 and in order to have the pull upon the brace or line 5 applied to the said sleeve at right angles to the line or direction of travel of the planter, it has been found expedient to provide direction-arms 13 and connect them to the standard. These direction-arms extend beyond the curved arms 7 and curve inwardly and rearwardly toward their free ends so as to admit of the brace-rope 5 passing by their terminal portions when shifting its position. These direction-arms form the upright portions of an approximately U-shaped frame 14, which is secured in any substantial manner to the standard 6, and this frame is preferably constructed of stout wire or bar-iron bent into the required shape, substantially as shown.

Various changes in the form, proportion, and the minor details of construction may be resorted to without departing from the principle or sacrificing any of the advantages of this invention.

Having thus described the invention, what is claimed as new is—

1. In a planter, the combination with a marker and its brace, of a standard comprising oppositely-curved arms, a sleeve shiftably mounted upon the said arms, and a sliding connection between the front end of the brace and the sleeve, whereby the said connection may occupy the lowest position upon either adjustment of the sleeve, substantially as set forth.

2. In a planter, the combination with a marker and its brace, of a standard comprising oppositely-curved arms formed with stops or shoulders, a sleeve shiftably mounted upon the arms and limited in its movements by the stops thereof, and a slidable connection between the said sleeve and the front end of the aforesaid brace, whereby the said connection may occupy the lowest position at either adjustment of the said sleeve, substantially as specified.

3. In a planter, the combination with a marker and its brace, of a standard having oppositely-disposed arms, a sleeve shiftably mounted upon the arms, a sliding connection between the brace and sleeve, and direction-arms exterior to the arms of the standard and curving inwardly and rearwardly toward their free ends, substantially as set forth for the purpose described.

In testimony that I claim the foregoing as my own I have hereto affixed my signature in the presence of two witnesses.

SQUIRE W. MYERS.

Witnesses:
 THOS. W. EVANS,
 ED. G. ABLISTNER.